United States Patent [19]
Bond

[11] 3,745,302
[45] July 10, 1973

[54] LOCKING DEVICE FOR AN ADJUSTABLE SUPPORT SYSTEM

[75] Inventor: David A. Bond, Rolling Hills, Calif.

[73] Assignee: Agbabian-Jacobson Associates, El Segundo, Calif.

[22] Filed: June 24, 1971

[21] Appl. No.: 156,432

[52] U.S. Cl. .................. 219/213, 52/173, 219/243, 238/1, 238/283
[51] Int. Cl. .......................................... H05b 3/06
[58] Field of Search.................. 219/213, 385, 420, 219/243, 10.53, 10.79; 238/1, 283, 281, 282, 287, 269, 270, 271, 2; 52/173; 269/7, 285, 286; 137/341

[56] References Cited
UNITED STATES PATENTS

| | | | |
|---|---|---|---|
| 1,818,485 | 8/1931 | Lambert | 219/243 |
| 1,863,855 | 6/1932 | Jenkins | 219/243 |
| 3,110,319 | 11/1963 | Arata et al. | 137/341 |
| 3,565,336 | 2/1971 | Eisses | 238/283 X |
| 956,045 | 4/1910 | Davidson | 238/269 |
| 3,157,097 | 11/1964 | Stinnett et al. | 52/173 |

Primary Examiner—J. V. Truhe
Assistant Examiner—B. A. Reynolds
Attorney—John Holtrichter, Jr.

[57] ABSTRACT

In a system for adjusting the position of a structure relative to its foundation and thereafter rigidly securing the structure in the exact position of adjustment, there is herein disclosed a locking device including a meltable matrix material disposed in an opened-top cavity in a base and also including a support member extending into the matrix material which material rigidly holds the support member in a fixed position until a heating element in the support member is activated. Once freed, the structure may be moved by any conventional auxiliary mechanism, and when so aligned the support member is again locked by deactivating the heating element.

2 Claims, 2 Drawing Figures

David A. Bond,
INVENTOR.

ATTORNEY.

LOCKING DEVICE FOR AN ADJUSTABLE SUPPORT SYSTEM

BACKGROUND OF THE INVENTION

The background of the invention will be set forth in two parts.

1. Field of the Invention

The present invention pertains generally to the field of structural supports and more particularly to a support system using a locking device capable of providing either freedom of motion or rigid restraint in six degrees-of-freedom.

2. Description of the Prior Art

The art of structural supports is as old as structures themselves. Most such supports are fixed in place and are usually massive, such as concrete foundations, for example. For many applications, the structure once erected is not moved and therefore does not require an adjustable support. However, there are other structures which must be initially adjusted after being erected, such as certain types of bridges and trestles, for example. These constructions generally are not adversely affected by most earth movements and do not thereafter require periodic adjustments.

On the other hand, other structures such as certain bridge span supports on columns or abutments and high speed elevated track and guideways used by advanced rail and air cushion vehicles and train systems do require not only an initial adjustment but also periodic adjustments to compensate for settlement of the supports under static and dynamic loads and earthquake disturbances. The facilitation of such periodic adjustment is needed to reduce alignment maintenance costs which have been a limiting factor in the development of advanced rail systems, for example.

Most adjustable supports presently known for supporting massive structures are not only difficult to adjust but are also limited severely in their freedom-of-motion. Generally, these support devices allow only three degrees-of-freedon, namely, they usually allow free positioning in only one direction of translation and two directions of rotation. These systems also have the disadvantage of having close-fitting and moving parts and require the use of shims, spherical washers, wedges, bolts, grouted fittings, and the like. These techniques have been also found to be somewhat sensitive to weather aging effects, may not be failsafe, and are costly to procure, maintain and use since they cannot be quickly and simply readjusted.

SUMMARY OF THE INVENTION

In view of the foregoing factors and conditions of the prior art, it is a primary object of the present invention to provide a new and improved locking device for an adjustable support system, not subject to the disadvantages enumerated above.

It is another object of the present invention to provide an adjustable support device which allows adjusting the position of a structure relative to its foundation and thereafter rigidly secures the structure in the exact position of adjustment.

It is also another object of the present invention to provide an adjustable support device for the repositioning of a structure on its foundation and thereby enabling alignment to be maintained through periodic adjustment.

It is a further object of the present invention to provide a small, simple, inexpensive device for attaching to and supporting massive structures on foundations, which device when "unlocked" permits free positioning in three orthogonal directions of translation, as well as in three axes of rotation (six degrees-of-freedom) and which device when "locked" rigidly restrains motion in the same six degrees-of-freedom.

It is still another object of the present invention to provide a relatively inexpensive locking device for an adjustable support system which device can be quickly "unlocked" or "locked" by simply applying or removing electrical power.

It is still a further object of the present invention to provide an inherently fail-safe adjustable support locking device that is insensitive to weather and aging effects, that contains no close-fitting or moving parts, and that simplifies initial installation and readjustments thereafter.

It is yet a further object of the present invention to provide a locking device in an adjustable support system for the alignment of massive civil structures, such as bridge span supports, on columns and abutments of high speed elevated tracks and guideways used by advanced rail and air-cushioned vehicles and train systems.

According to an embodiment of the present invention, a locking device for an adjustable support system is provided which includes a base member having a cavity therein and an upper surface, the cavity communicating with the upper surface. Disposed in the cavity is a meltable matrix material which is in its solid state at ambient temperature. The system also includes a structure support member having a lower portion extending down into the cavity and immersed in and rigidly held in a fixed position by the matrix material. The structure support member includes heating means for melting the matrix material and thereby freeing the structure support member to move in six degrees-of-freedom only for the time the heating means is activated.

The positioning force may be provided by a portable auxiliary jacking system, for example.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawings, in which like reference characters refer to like components in the several views.

DESCRIPTION OF THE INVENTION

Figure 1:
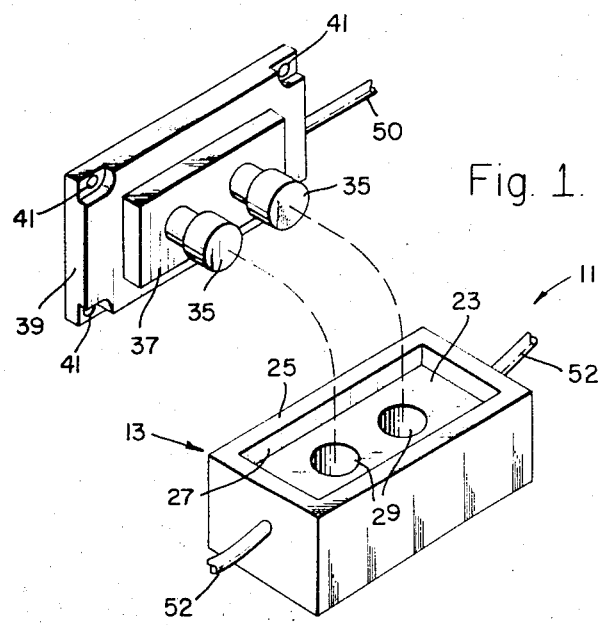
FIG. 1 is a perspective view of a presently preferred embodiment of the present invention.
Figure 2:
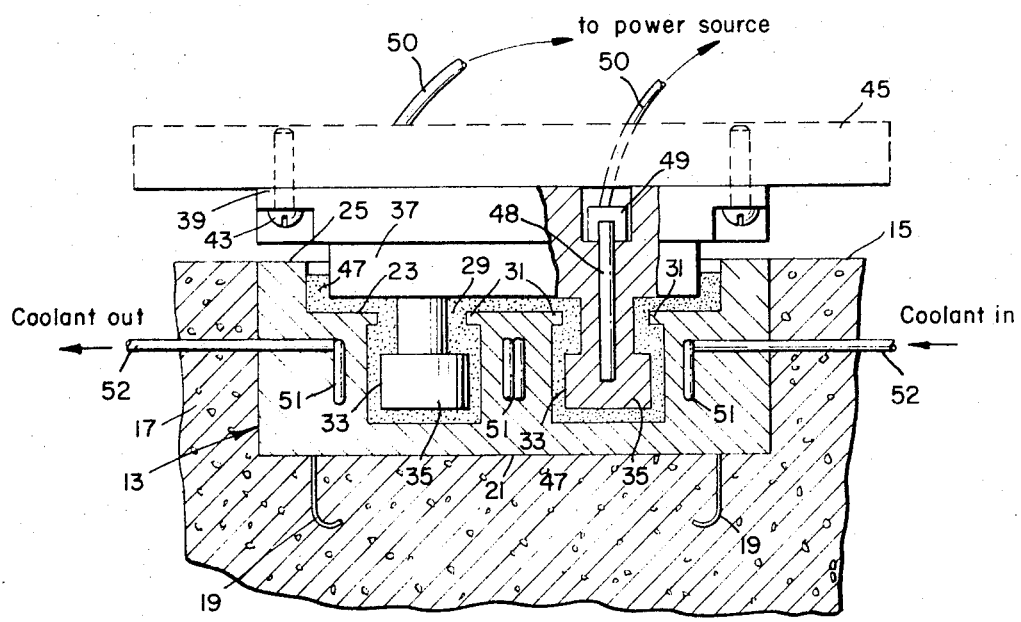
FIG. 2 is an enlarged side elevational view, partially in section, illustrating in more detail the various components and elements of the device of FIG. 1.

Referring now to the drawing, and more particularly to FIGS. 1 and 2, there is shown an adjustable support system 11 including an iron or steel base member 13 embedded at the top 15 of a concrete column 17 and anchored therein by L-shaped anchor bolts 19, extending from a lower surface 21 of the member 13.

The base member 13 has a generally rectangular horizontal surface 23 below an upper surface 25 so as to create a well 27 about the surface 23. Disposed in the member 13 are a pair of circular cavities 29 communicating with the horizontal surface 23. As seen in FIG. 2, the cavities 29 have reduced diameter lip portion 31 at their upper extremities, but it should be understood that although used in the presently preferred embodiment of the invention, they are not essential to the operation of the system.

Within each of the cavities 29 is disposed a lower portion 33 of a structure support member 35. Each of the members 35 extend from a rectangular steel structure plate 37 that is a part of or attached by any conventional means to a larger structure attachment member 39. This member includes apertures 41 for accommodating bolt 43 which may attach to a structure 45 requiring adjustable support.

Support members 35 are dimensioned and aligned to fit within the cavities 29 and to allow a meltable matrix material 47 to surround the members 35, as clearly shown in FIG. 2. At ambient temperatures, the matrix material 47 is in its solid state and rigidly holds support members 35 (and the structure 45 attached thereto) in a fixed, "locked" position. The material 47, however, has a relatively low melting temperature and when heated to this level, it flows to "unlock" and allow the support members 35 to move freely in three orthogonal directions of translation and in three axes of rotation.

The matrix material is heated, in this embodiment, by an electrical heating unit 48 wired in series with a conventional thermostatic switch 49 located in each of the support structures 35. The heating units may be of the AC or DC type and are electrically connected to a suitable source of power (not shown) by cables 50. The action of the thermoswitch is to control the temperature of the heating element 48 to which it is attached, within desired limits. As an example of a typical unit, the power source may be 230 volts AC three-phase, and each element may consume 5 kilowatts of power when heating the matrix material to "unlock" the system.

The matrix material 47 preferably melts in the range of between 200° and 400° F, develops high early strength in cooling, and has a compressive strength of at least 4,000 psi. The material should also flow well and not shrink on cooling or otherwise develop voids which would lower its strength characteristics. Another desirable characteristic is that of rapid melting and solidifying so that adjustments may be made quickly.

Such materials as sulfur-aluminum aggregate of a 1:1 ratio has been found to be satisfactory, as well as a sulfur-sand aggregate which melts at approximately 240°F. Other matrix materials which may be useful in this application are sulfur (with a cap of paraffin wax, for example, to limit fumes), and eutectic alloys. One such alloy found suitable is an alloy composed of 58% Bismuth and 42% tin. This alloy melts at 281°F, expands slightly on cooling and has 5,000 psi compressive strength.

When fast readjustment of these devices is desired, the cooling period of the matrix material may be lessened by incorporating a fluid carrying coolant conduit 52 in the base member 13. The conduit may encircle the cavities 29 or it may communicate with coolant passages 51 cast or otherwise provided in the base. Any conventional liquid coolant, such as water, for example, may be caused to flow through the cooling system to quickly reduce the temperature of the matrix 47.

From the foregoing, it should be evident that a very advantageous and novel adjustable support system has been described which overcomes the disadvantages of the prior art and is reliable and safe to use.

It should also be understood that the materials used in fabricating the various parts and elements of the invention are not critical and any material generally considered to be suitable for a particular function may be utilized.

Accordingly, it is intended that the foregoing disclosure and drawing shall be considered only as illustrations of the principles of this invention.

What is claimed is:

1. A locking device for an adjustable support system, comprising:
   a base member having at least two cavities therein and an upper surface, said cavities communicating with said upper surface;
   a meltable matrix material disposed in said cavities, said matrix material being in its solid state at ambient temperature; and
   a separate structure support member associated with each of said cavities, said support members having lower portions extending down into said cavities in spaced relation to the walls thereof and immersed and rigidly held in a fixed position by said matrix material, said support members each including heating means for melting said matrix material and thereby freeing said support members to move in six degrees-of-freedom only for the time said matrix material is in its molten state.

2. A device according to claim 1, wherein said structure support members extend from an adjustable support plate in a spaced but parallel relationship.

* * * * *